US008639986B2

(12) United States Patent
Aphale

(10) Patent No.: US 8,639,986 B2
(45) Date of Patent: Jan. 28, 2014

(54) FIRMWARE TRACING IN A STORAGE DATA COMMUNICATION SYSTEM

(75) Inventor: Abhijit Suhas Aphale, Pune (IN)

(73) Assignee: LSI Corporation, Milpitas, CA (US)

( * ) Notice: Subject to any disclaimer, the term of this patent is extended or adjusted under 35 U.S.C. 154(b) by 620 days.

(21) Appl. No.: 12/891,840

(22) Filed: Sep. 28, 2010

(65) Prior Publication Data
US 2012/0079324 A1  Mar. 29, 2012

(51) Int. Cl.
*G06F 11/00* (2006.01)

(52) U.S. Cl.
USPC ............... 714/45; 714/39; 714/712; 370/257; 710/5

(58) Field of Classification Search
USPC ................... 714/712, 39, 45; 370/257; 710/5
See application file for complete search history.

(56) References Cited

U.S. PATENT DOCUMENTS

| 6,047,353 | A | 4/2000 | Vishlitzky et al. | |
| 7,254,115 | B1 * | 8/2007 | Lakhanpal et al. | 370/257 |
| 7,359,994 | B1 * | 4/2008 | Lakhanpal et al. | 710/5 |
| 2001/0016925 | A1 * | 8/2001 | Bucher et al. | 714/39 |
| 2002/0091977 | A1 * | 7/2002 | Mastro et al. | 714/712 |
| 2003/0131098 | A1 * | 7/2003 | Huntington et al. | 709/224 |
| 2003/0195958 | A1 * | 10/2003 | Byron et al. | 709/224 |
| 2004/0054776 | A1 * | 3/2004 | Klotz et al. | 709/224 |
| 2006/0268732 | A1 * | 11/2006 | Smith | 370/252 |
| 2007/0038880 | A1 * | 2/2007 | Noble et al. | 714/2 |
| 2008/0263408 | A1 * | 10/2008 | Brand et al. | 714/45 |
| 2009/0282290 | A1 * | 11/2009 | Noble | 714/39 |

FOREIGN PATENT DOCUMENTS

JP   3175541   7/1991

OTHER PUBLICATIONS

"ItswTCM: a new aggregate marker to improve fairness in DiffServ" by Hongjun Sua, Mohammed Atiquzzamanb; Received Mar. 19, 2002; revised Aug. 23, 2002; accepted Oct. 10, 2002; pp. 10. ; (Last Visited Oct. 26, 2010).

* cited by examiner

*Primary Examiner* — Joshua P Lottich
*Assistant Examiner* — Jeison C Arcos
(74) *Attorney, Agent, or Firm* — Raj Abhyanker, P.C.

(57) ABSTRACT

A method includes generating trace data at a device associated with data communication to and from a computer storage device through an appropriate communication link therefor and transmitting the trace data through the appropriate communication link. The trace data is configured to enable debugging of a set of instructions associated with the device. The method also includes capturing the trace data transmitted through the appropriate communication link through a protocol analyzer, a host system or the protocol analyzer coupled to the host system and analyzing the trace data therein to obtain information associated with the set of instructions associated with the device. The protocol analyzer, the host system or the protocol analyzer coupled to the host system is configured to be external to the device associated with the data communication to and from the computer storage device.

17 Claims, 10 Drawing Sheets

FIRMWARE TRACING IN A STORAGE DATA COMMUNICATION SYSTEM

FIELD OF TECHNOLOGY

This disclosure relates generally to storage data communication systems and, more particularly, to a method, an apparatus and/or a system of firmware tracing in a storage data communication system.

BACKGROUND

In order to cope with the demands of high density computing, groups of targets in, for example, blade server environments may need to be coupled to one another. Serial Attached Small Computer System Interface (Serial Attached SCSI, or, SAS) technology may address storage connectivity issues due to the low cost and efficient interconnectivity thereof. A SAS environment may be associated with a datacenter. The main components of the SAS environment may be host controllers, adapters, expanders and/or multiplexers. The aforementioned main components of the SAS environment may be buried deep in the system such that there may be no external access thereto.

The only interface to the main components (e.g., interface to "Just a Bunch of Disks" (JBODs) associated therewith) in the SAS environment may be the SAS link therebetween. There may be management interfaces therein but, again, access thereto may be difficult. If a main component of the SAS environment requires debugging (e.g., debugging firmware/software associated therewith), it may be difficult to access debugging interfaces associated therewith. Although at a development board level the requisite connectors for debugging may be available, the end systems at the datacenter of deployment may not have access thereto.

Tracing may be a common method to enable debugging of the firmware/software associated with the main components of the SAS environment. Traces may include small bits of code written into the firmware/software that are configured to detect the program flow. A common method of firmware tracing includes allocating a trace buffer (e.g., circular buffer) in the firmware/software to which the trace points may be logged. The trace buffer may be exported out of the deeply buried components through different transport mechanisms (e.g., Trivial File Transfer Protocol (TFTP), Telnet, SCSI read buffer, Universal Asynchronous Receiver/Transmitter (UART)).

The aforementioned method of firmware tracing may require allocation of the trace buffer in a processor (e.g., Random-Access Memory (RAM)) associated with the main component of the SAS environment, which may impose restrictions on the amount of trace buffer allocation. An accurate time-stamping of trace data may be required of the firmware/software, for which the system may lack the ability. The processor enabled tracing may not be used in end products associated with the datacenter due to the lack of debugger headers and/or physical access restrictions imposed due to the enclosure design thereof. The software implementation of the trace buffer may tend to affect real-time performance and/or may consume critical memory resources associated with the main component(s) of the SAS environment.

SUMMARY

Disclosed are a method, an apparatus and/or a system of firmware tracing in a storage data communication system.

In one aspect, a method includes generating trace data at a device associated with data communication to and from a computer storage device through an appropriate communication link therefor and transmitting the trace data through the appropriate communication link. The trace data is configured to enable debugging of a set of instructions associated with the device. The method also includes capturing the trace data transmitted through the appropriate communication link through a protocol analyzer, a host system or the protocol analyzer coupled to the host system and analyzing the trace data at the protocol analyzer, the host system or the protocol analyzer coupled to the host system to obtain information associated with the set of instructions associated with the device. The protocol analyzer, the host system or the protocol analyzer coupled to the host system are configured to be external to the device associated with the data communication to and from the computer storage device.

In another aspect, a storage data communication system includes a computer storage device and a device configured to generate trace data associated with data communication to and from the computer storage device through an appropriate communication link therefor. The trace data is configured to enable debugging of a set of instructions associated with the device. The device is further configured to transmit the trace data through the appropriate communication link. The storage data communication system also includes a protocol analyzer, a host system or the protocol analyzer coupled to the host system configured to capture the trace data transmitted through the appropriate communication link. The protocol analyzer, the host system or the protocol analyzer coupled to the host system is configured to be external to the device associated with the data communication to and from the computer storage device. The trace data is configured to be analyzed at the protocol analyzer, the host system or the protocol analyzer coupled to the host system to obtain information associated with the set of instructions associated with the device.

In yet another aspect, a method includes logging a trace of execution of a set of instructions associated with a device through a protocol analyzer, a host system or the protocol analyzer coupled to the host system and analyzing data associated with the trace of execution at the protocol analyzer, the host system or the protocol analyzer coupled to the host system. The device is associated with data communication to and from a computer storage device through an appropriate communication link therefor. The method also includes debugging the set of instructions associated with the device based on the analysis of the data associated with the trace of execution. The protocol analyzer, the host system or the protocol analyzer coupled to the host system is configured to be external to the device associated with the data communication to and from the computer storage device.

The methods and systems disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

The embodiments of this invention are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

Disclosed are a method, an apparatus and/or a system of firmware tracing in a storage data communication system. Although the present embodiments have been described with reference to specific example embodiments, it will be evident that various modifications and changes may be made to these embodiments without departing from the broader spirit and scope of the various embodiments.

Figure 1:
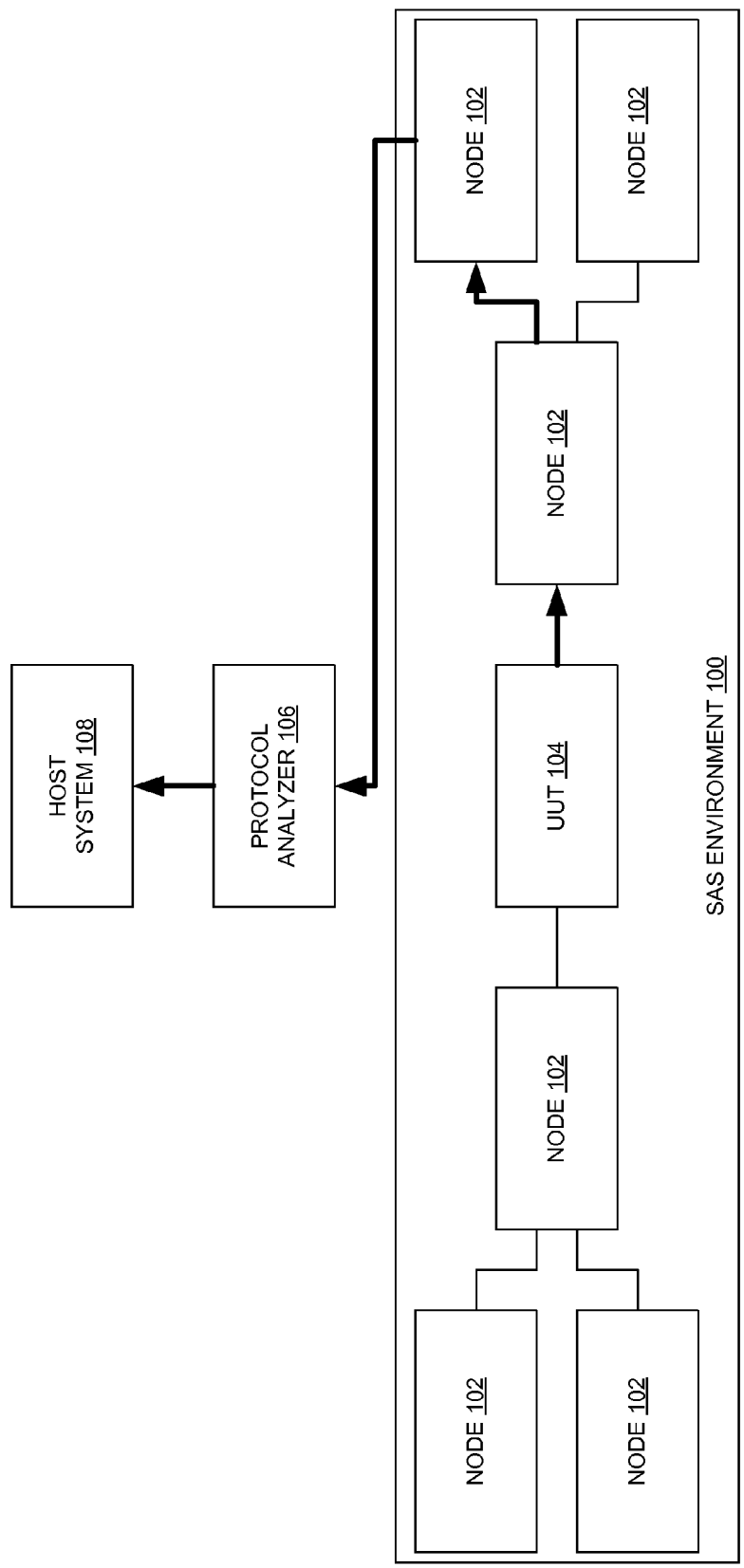
FIG. 1 is a schematic view of trace capturing and analysis in a Serial Attached Small Computer System Interface (Serial Attached SCSI, or, SAS) environment, according to one or more embodiments.

FIG. 1 shows trace capturing and analysis in a Serial Attached Small Computer System Interface (Serial Attached SCSI, or, SAS) environment 100, according to one or more embodiments. In one or more embodiments, SAS environment 100 may be a blade server environment, a set of "Just a Bunch of Disks" (JBODs) and/or may be deployed in a datacenter. In one or more embodiments, components of SAS environment 100 such as host controllers (e.g., Host Bus Adapters (HBAs)), adapters, expanders and/or multiplexers (e.g., LSI®'s Active-Active Multiplexer devices (AAMUX™s)) may be deeply buried in the system associated with SAS environment 100. FIG. 1 shows multiple constituent nodes 102 of SAS environment 100. For example, each constituent node 102 may be a SAS component (e.g., host controller, expander) and/or may be associated with a JBOD. In one example embodiment, the JBOD may include drives coupled to an expander (or, one or more expander(s)) through port selector(s).

FIG. 1 also may include a Unit Under Test (UUT) 104, which, in one example embodiment, may be a host controller on which a firmware/software (e.g., a set of instructions) is configured to execute. The firmware may include instructions, programs and/or data structures configured to control the host controller and/or the data flow thereto/therefrom. In one or more embodiments, UUT 104 may be a constituent node 102 of SAS environment 100. FIG. 1 shows that UUT 104 is a constituent node 102 of interest. Or, in other words, UUT 104 is a constituent node 102 whose trace data is of interest. It is obvious that any constituent node 102 may be tagged as UUT 104. In one or more embodiments, the capture of the trace data associated with UUT 104 and the subsequent analysis thereof may be made possible at protocol analyzer 106 and/or host system 108. In FIG. 1, protocol analyzer 106 is shown as being configured to receive data from a constituent node 102 of SAS environment 100, and host system 108 as being configured to receive data from protocol analyzer 108. However, as will be discussed below, host system 108 may also be configured to directly analyze/buffer trace data associated with UUT 104.

Also, in FIG. 1, the flow of data from UUT 104 to protocol analyzer 106 and/or host system 108 is indicated through arrows thicker than the links between constituent nodes 102. A datacenter may include a number of rack servers, some of whose slots may be occupied by host systems running operating systems (e.g., UNIX, Oracle®'s Solaris™) thereon. Other slots in the rack servers may be associated with disk storage systems. The host systems and the disk storage systems may be configured to communicate with each other through protocols (e.g., SAS, Fibre Channel Protocol (FCP); SAS used here as an example). Thus, in FIG. 1, host system 108 may be analogous to one of the abovementioned host systems running operating systems thereon. Protocol analyzer 106 may be coupled to any SAS link of SAS environment 100.

Figure 2:
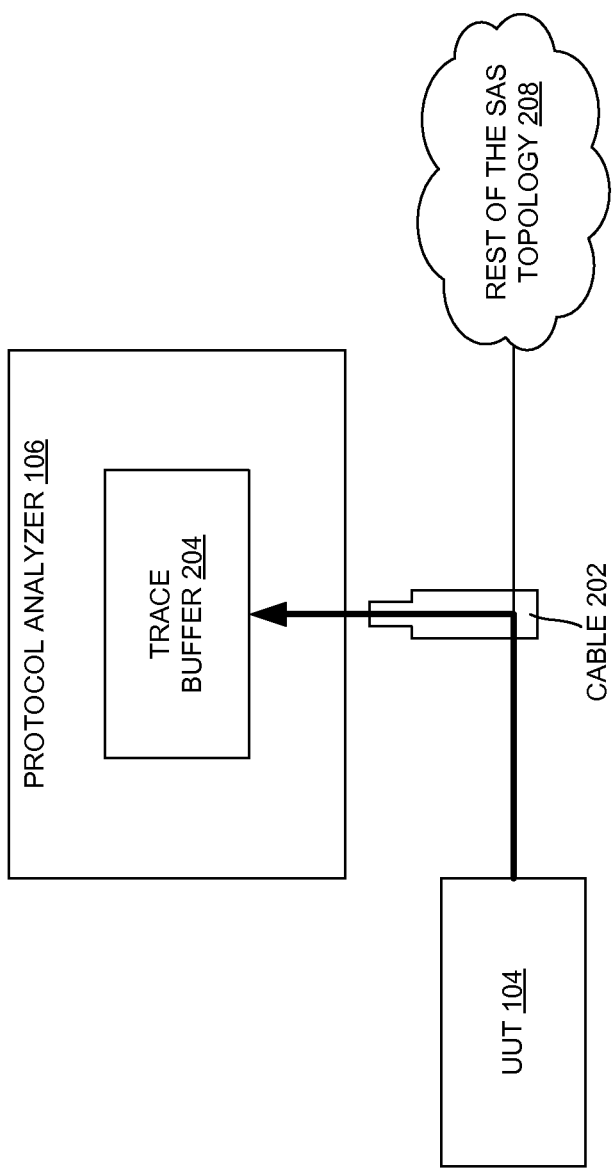
FIG. 2 is a schematic view of firmware tracing using a protocol analyzer, according to one or more embodiments.

FIG. 2 shows firmware tracing using protocol analyzer 106, according to one or more embodiments. In one or more embodiments, as discussed above, the firmware may be configured to execute on UUT 104. For example, in a JBOD, the firmware may be configured to execute on an expander (an example of UUT 104). In another example, the firmware may be configured to execute on any SAS chip (another example of UUT 104) of SAS environment 100. Data (e.g., service requests, task management requests) may be transmitted from an initiator device of SAS environment 100 to a target device (e.g., a hard disk, disk array system, JBOD) therein. An expander may be configured to route the data through the topology of SAS environment 100.

Thus, in one or more embodiments, the SAS link between constituent nodes 102 of SAS environment 100 may be utilized to obtain an insight into the working of the firmware. For example, the firmware of UUT 104 may be configured to transmit tracing data (e.g., an arbitrary DWORD) on the SAS link, which may then be intercepted by protocol analyzer 106 coupled (e.g., through cable 202) to the SAS link, as shown in FIG. 2. In one or more embodiments, protocol analyzer 106 may be a combination of hardware and software designed for use with specific bus architectures. In the aforementioned association of protocol analyzer 106 with SAS environment 100, protocol analyzer 106 may be a SAS analyzer.

In one or more embodiments, protocol analyzer 106 may be configured to have high buffering and filtering capabilities. In one or more embodiments, protocol analyzer 106 may also be configured to have a time-stamping capability of high granularity. For example, data captured through protocol analyzer 106 may be time-stamped with a nano-second/pico-second order resolution utilizing the timers therein. Thus, in one or more embodiments, data captured through protocol analyzer 106 may be time-stamped in a precise manner without requiring the firmware of UUT 104 to generate the timestamp. In one or more embodiments, UUT 104 may be configured to generate the trace data, and the firmware associated therewith may be configured to pick out the trace on the wire coupling UUT 104 and protocol analyzer 106. In one or more embodiments, the time-stamping of the trace data may be performed through protocol analyzer 106, which is an external device to SAS environment 100, as shown in FIG. 1 and FIG. 2.

In one or more embodiments, in order to maintain a precise timestamp, a large storage may be required. For example, a 64 bit number associated with a mega-timestamp may need to be stored. Therefore, in one or more embodiments, separate storage (e.g., memory in protocol analyzer 106, trace buffer 204) associated with protocol analyzer 106 may be utilized for the aforementioned purpose instead of storing the timestamps in a memory/trace buffer associated with the firmware of UUT 104. Therefore, in one or more embodiments, as shown in FIG. 2, trace buffer 204 associated with protocol analyzer 106 may be utilized instead of the trace buffer associated with the firmware of UUT 104. Thus, in one or more embodiments, the trace buffering capability may only be limited by the buffering capabilities (e.g., trace buffer 204) of protocol analyzer 106, and the stringent trace buffer allocation requirements associated with the firmware of UUT 104 may be relaxed. FIG. 2 also shows rest of the SAS topology 208 (e.g., constituent nodes 102) as being associated with UUT 104.

In one or more embodiments, the speed at which trace points are logged may be limited solely by the time required to write to the hardware register associated with UUT 104. In one or more embodiments, increasing speed of SAS links may not be a bottleneck as trace buffering capability is associated with protocol analyzer 106.

Analysis of the trace data at protocol analyzer 106 may be discussed with reference to examples. In one example embodiment, assume that a tracing DWORD is received from the firmware of UUT 104, and that a tracing DWORD is encoded with unique identification data associated with a specific line in a specific file of the source code. Each tracing DWORD entered/stored at protocol analyzer 106 may be configured to certify the line number and the program file at which the code execution is/was. This may allow for a graphical regeneration of the program flow (e.g., the function called, the sequence in which the function was called, the path of execution of the code etc) to be realized.

Thus, in one or more embodiments, the regeneration of code execution and/or the history of execution (e.g., function, decision taken by the function, the branch in which the code execution carried on) may be obtained through analysis of DWORDs at protocol analyzer 106. In one example embodiment, the execution flow of the code may not enter an expected function. Here, through observing the flow of the code, the aforementioned phenomenon may be detected. For example, a new JBOD associated with UUT 104 may be connected in SAS environment 100 but may not be detected therein. Through observing the trace data, it may be inferred that a particular portion of the code associated with the detection of the new JBOD was never executed. In another example, the firmware may be stuck in a fault condition associated with the source code, which may be inferred through the observation of the trace data.

Figure 3:
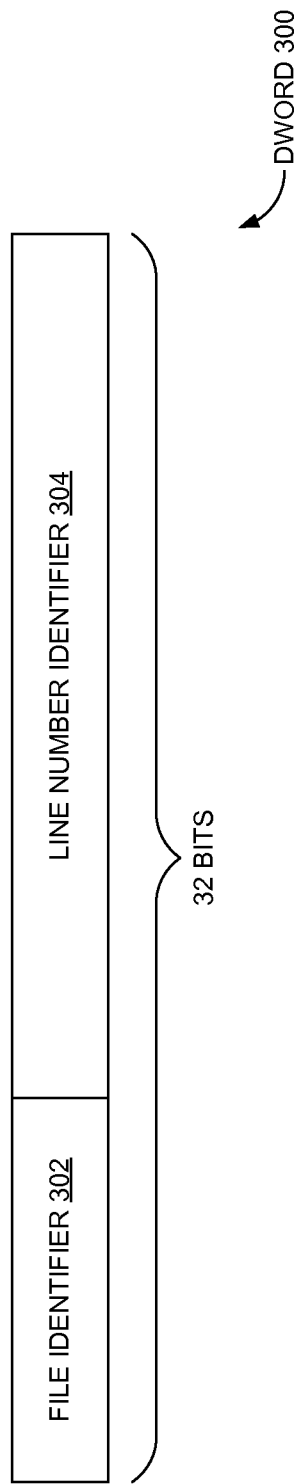
FIG. 3 is a schematic view of segmentation of a DWORD into a file identifier and a line number identifier, according to one or more embodiments.

FIG. 3 shows segmentation of a DWORD 300 into a file identifier 302 and a line number identifier 304, according to one or more embodiments. The example DWORD 300 discussed with regard to FIG. 3 may be 32 bits in length. In one or more embodiments, DWORD 300 may be dedicated to signify a trace point in the firmware of UUT 104, as discussed above. DWORD 300 may be segmented into file identifier 302 and line number identifier 304 (totaling 32 bits here in FIG. 3), and source code coverage analysis may be performed at protocol analyzer 106.

In one or more embodiments, the segmentation of the unique identification data associated with DWORD 300 may create a hierarchical information structure (e.g., segmentation to denote module, file, line number of code). Here, for example, the firmware of UUT 104 may be configured to write the unique identification data into a hardware register associated therewith and to transmit the aforementioned data on the SAS line. Protocol analyzer 106 may be configured to capture DWORD 300 and store DWORD 300 in trace buffer 204 for subsequent analysis.

Figure 4:
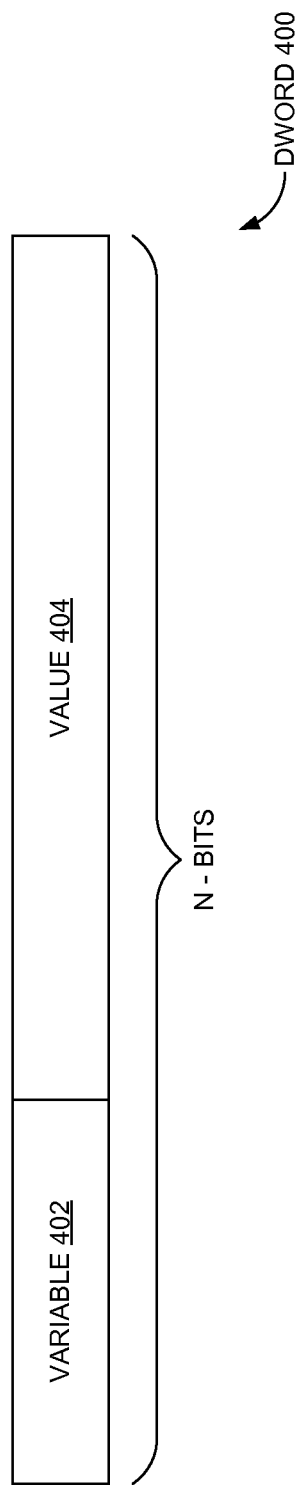
FIG. 4 is a schematic view of segmentation of a DWORD for purposes of scalar variable monitoring, according to one or more embodiments.

In one or more embodiments, DWORDs may be utilized to monitor variable values. For example, a variable may be associated with the total number of drives present in SAS environment 100 and/or associated with UUT 104. The change in the value associated with the variable may be monitored to detect addition and/or removal of a drive. FIG. 4 shows segmentation of a DWORD 400 for purposes of scalar variable monitoring, according to one or more embodiments. In one or more embodiments, DWORD 400 may be segmented into variable 402 and the value associated therewith (e.g., value 404). In one or more embodiments, N bits of DWORD 400 may be utilized for segmentation purposes. In one or more embodiments, the aforementioned variable monitoring may find use in performance counters and/or error counters.

Figure 5:
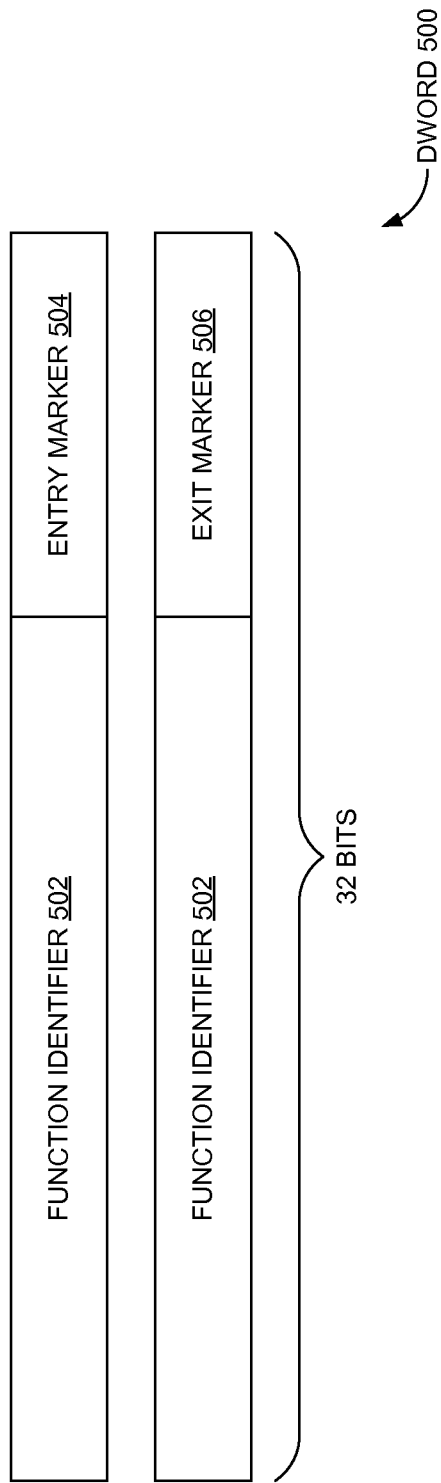
FIG. 5 is a schematic view of segmentation of a DWORD into a function identifier and an entry marker/exit marker, according to one or more embodiments.

In one or more embodiments, DWORDs may be utilized to monitor function execution. For example, on every function entry and/or exit, the firmware may be configured to transmit a DWORD indicating the function at which code execution was, the entry of code execution into the aforementioned function and/or the exit thereof. In one or more embodiments, protocol analyzer 106 may be configured to place a timestamp on function entry and/or exit of code execution. Thus, in one or more embodiments, the execution time associated with functions may be measured. FIG. 5 shows segmentation of a DWORD 500 into a function identifier 502 and an entry marker 504/exit marker 506, according to one or more embodiments. In one or more embodiments, entry marker 504 and exit marker 506 may be in the form of an entry flag and an exit flag, each of which is one or more bit(s) in length. As an example, FIG. 5 shows a 32 bit DWORD 500 being segmented into function identifier 502 and entry marker 504/exit marker 506. In one or more embodiments, measurement of function execution times may be possible through the aforementioned segmentation. In one or more embodiments, the same segmentation mechanism may be utilized to measure execution time between any two arbitrary points in code execution based on the unique identification of the execution points. It is obvious that DWORDs may be split in ways different from those shown in FIGS. 3-5. Further, it is obvious that non-DWORD data lengths (e.g., >32 bits) may be segmented into identifiers associated with the code execution.

In one or more embodiments, the function name may also be identified through the unique identification data followed by the parameters passed into the function. In one or more embodiments, this may be useful to profile the function execution time with respect to different values of the parameters. In one or more embodiments, the unique identification data may be utilized to trigger specific actions from a jammer logged in between any two units or two constituent nodes 102 of SAS environment 100. For example, a JBOD may be coupled to a server, and the jammer may be logged in therebetween. The programmable jammer may be configured to corrupt the data during start-up and/or closing in order to enable verification as to whether the firmware/software is functional and/or able to cope with error. Thus, in one or more embodiments, the jammer functionality may be utilized in automated testing, where the firmware may utilize the mechanism to invoke certain tester actions. In one or more embodiments, the aforementioned tester actions may form the basis of a communication protocol between UUT 104 and a tester circuit.

In one or more embodiments, the unique identification data may be configured to be transmitted outside the SAS link and/or within the SAS link. In one or more embodiments, transmission outside the SAS link may not require any connection establishment overhead. FIG. 1 shows transmission outside the SAS link merely for illustrative purposes. In one or more embodiments, within the SAS link, it may be possible to transmit the unique identification data between any two end points (e.g., initiator and target). However, in one or more embodiments, the transmission within the SAS link may require connection establishment and maintenance overhead.

Figure 6:
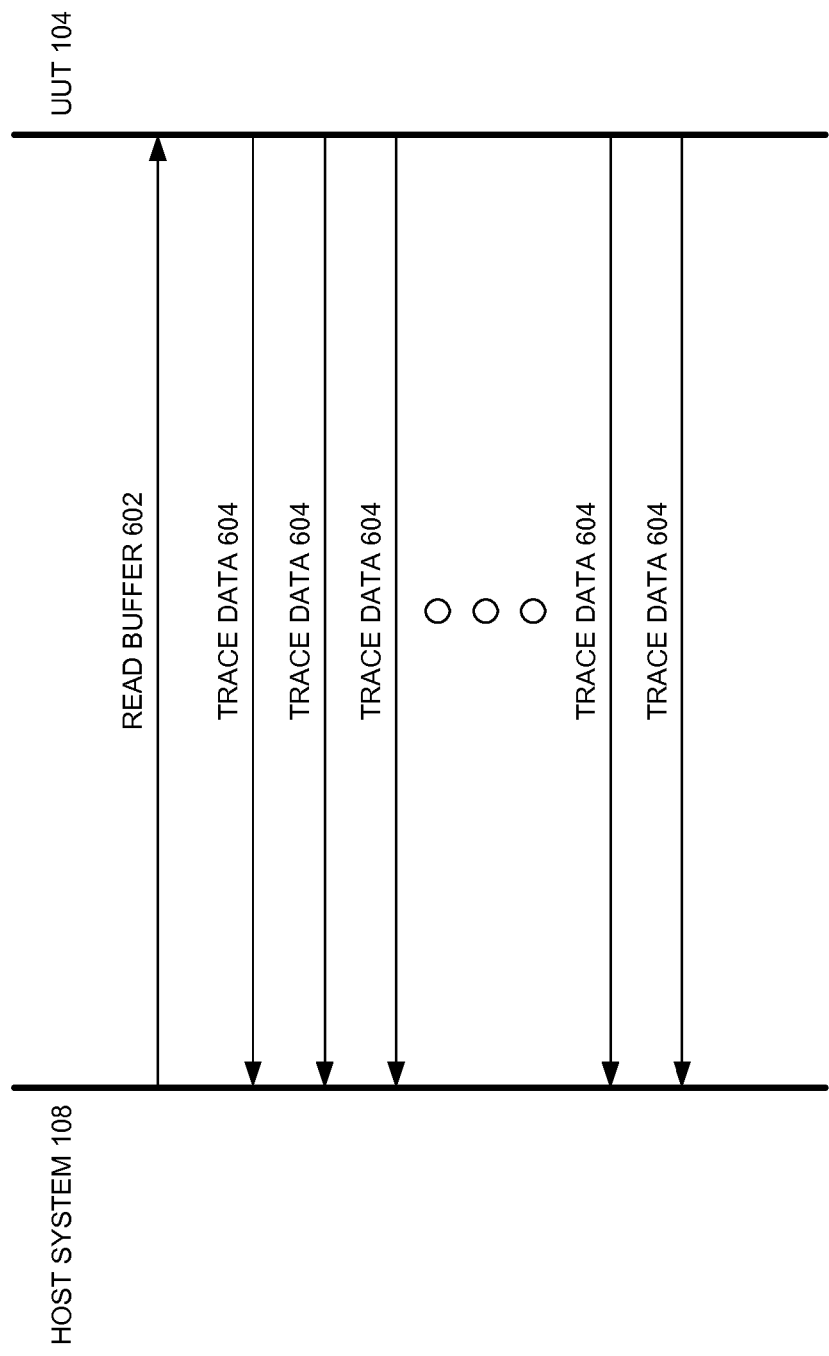
FIG. 6 is a schematic view of a perpetual read mode for transporting trace data out of a Unit Under Test (UUT), according to one or more embodiments.

In one or more embodiments, as discussed above, exporting the trace buffer out of UUT 104 may include utilizing host system 108 for capture/buffering of trace data. FIG. 6 shows a perpetual read mode for transporting trace data out of UUT 104, according to one or more embodiments. In one or more embodiments, depending on the volume of trace data, connection establishment and processing overhead, the sink of the trace output (e.g., host system 108; analysis through host system 108 will be discussed with reference to FIG. 8) may be configured to issue a READ BUFFER 602 command to the target UUT 104 in the system being traced. As will be discussed below with reference to FIG. 8, UUT 104 may include an intermediate trace buffer 806 configured to store the trace data (e.g., DWORDs) prior to the transmission thereof. In one or more embodiments, as and when the trace output is available, the available trace data (e.g., TRACE DATA 604) in intermediate trace buffer 806 (see FIG. 8) may be transmitted to host system 108 in a DATA frame. In one or more embodiments, the availability of the trace output may be determined based on a threshold percentage of intermediate trace buffer 806 and/or a threshold period of inactivity thereof. In one or more embodiments, a large READ BUFFER 602 command may be implemented in a vendor-specific mode or with multiple READ BUFFER commands, each of which has a limited size.

Thus, in one or more embodiments, the perpetual READ BUFFER 602 command may enable UUT 104 to push trace data (e.g., TRACE DATA 604) to host system 108 whenever the trace data becomes available.

Figure 7:
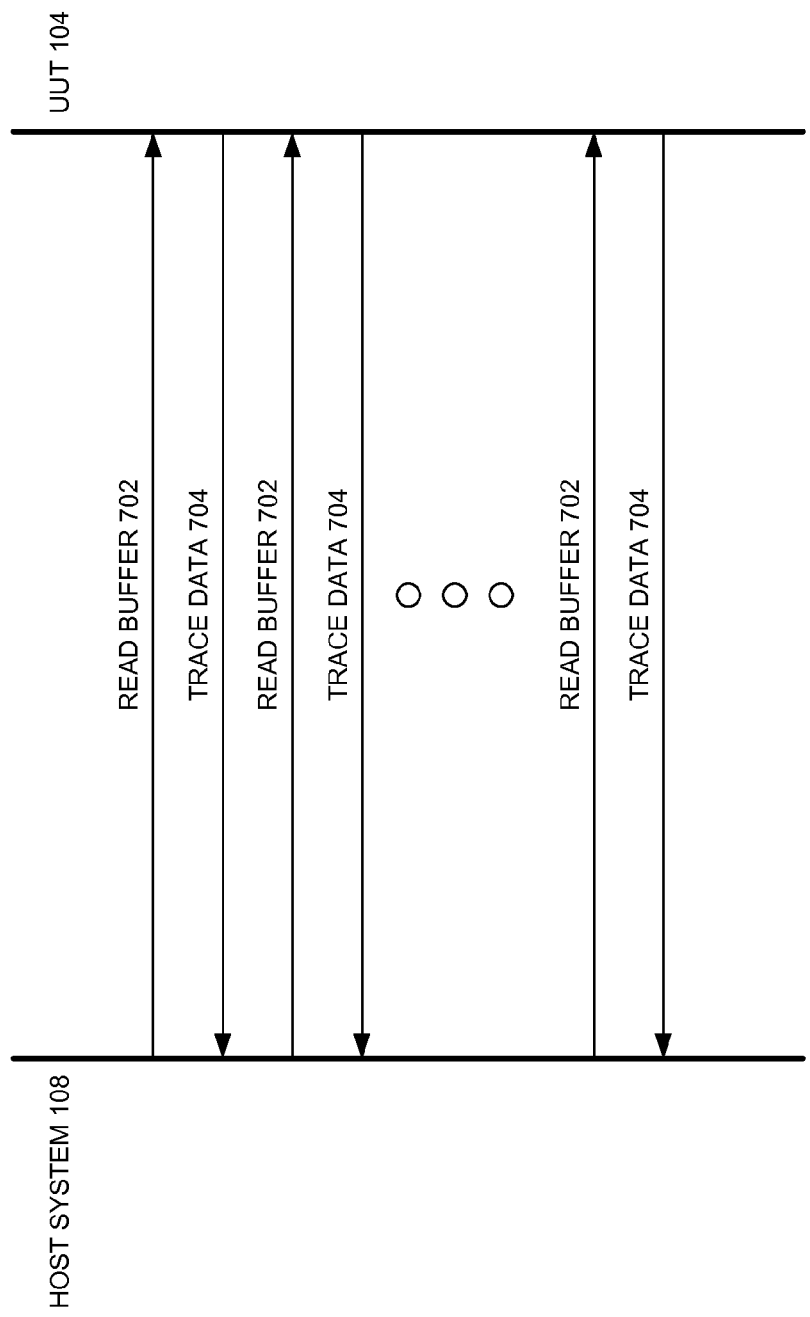
FIG. 7 is a schematic view of a PULL mode for transporting trace data out of the UUT, according to one or more embodiments.

FIG. 7 shows a PULL mode for transporting trace data out of UUT 104, according to one or more embodiments. Here, in one or more embodiments, host system 108 may be configured to transmit a READ BUFFER 702 command frequently (e.g., periodically) therefrom. In one or more embodiments, the frequent transmission of READ BUFFER 702 commands may ensure that a target UUT 104 incapable of handling concurrent commands is able to export the trace buffer (e.g., intermediate trace buffer 806) output (e.g., TRACE DATA 704) thereof. To summarize, in one or more embodiments, host system 108 may be configured to pull TRACE DATA 704 from time to time by issuing multiple READ BUFFER 702 commands.

Thus, in one or more embodiments, the trace buffer may be exported out of UUT 104 to host system 108. In one or more embodiments, host system 108 may issue an infinite READ BUFFER 602 command (using vendor-specific addressing mode) or may issue multiple READ BUFFER 702 commands (when target UUT 104 can service only one command at a time). In one or more embodiments, these approaches may allow for trace analysis at host system 108 without the need for protocol analyzer 106, which may be expensive. In one or more embodiments, these approaches may also allow extension of the reach of trace data to any accessible host node in the topology of SAS environment 100. In one or more embodiments, these approaches may not require protocol analyzers 106 to be placed between UUT 104 and adjacent SAS devices thereof.

Figure 8:
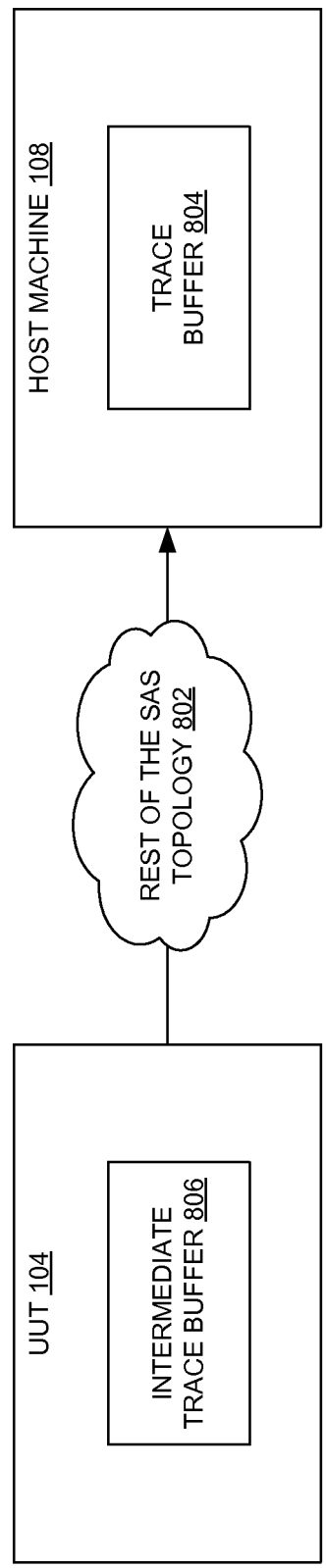
FIG. 8 is a schematic view of firmware tracing through a host system, according to one or more embodiments.

FIG. 8 shows firmware tracing through host system 108, according to one or more embodiments. In one or more embodiments, UUT 104 may be configured to transmit the trace data to host system 108 through rest of the SAS topology 802. The issuing of commands through host system 108 has been discussed in detail with regard to FIG. 6 and FIG. 7. Here, in one or more embodiments, UUT 104 may include an intermediate trace buffer 806 therein to enable storage of, say, the DWORD during preparation and transmission thereof. In one or more embodiments, intermediate trace buffer 806 may enable tackling of congestion associated with rest of SAS topology 802 through which trace data is transmitted to host system 108. In contrast, in FIG. 2, trace data may not flow through rest of SAS topology 208, thereby avoiding congestion associated therewith. Thus, in the case of UUT 104 communicating with protocol analyzer 106 as in FIG. 2, UUT 104 may not require an intermediate trace buffer therein analogous to intermediate trace buffer 806.

Although UUT 104 may require intermediate trace buffer 806 in FIG. 3, the buffer requirements may not be as stringent as when the buffer associated with UUT 104 is configured to perform the tracing. In one or more embodiments, host system 108 may include trace buffer 804 configured to allow for enhanced buffering capability. Trace buffer 804 may be analogous to trace buffer 204.

In one or more embodiments, when host system 108 and/or protocol analyzer 106 configured to perform the buffering malfunction, the tracing data associated therewith may be dropped/lost. Therefore, in one or more embodiments, fault tolerance/redundancy may be built into the system such that even in the event of a malfunction, a back-up host system 108 and/or protocol analyzer 106 may be configured to carry on the tasks.

In one or more embodiments, when protocol analyzer 106 is employed for time-stamping/buffering instead of host system 108, out-of-band communication may be established between UUT 104 and protocol analyzer 106. Here, previously established communication methods (e.g., through a protocol) may not be required, and protocol analyzer 106 may not be required to issue an appropriate command therefor. In one or more embodiments, protocol analyzer 106 may directly read the data transmitted through the wire of the corresponding SAS link. In contrast, when host system 108 is employed instead of protocol analyzer 106, the communication between UUT 104 and host system 108 may need to proceed as per established methods. Thus, firmware tracing through host system 108 may be subjected to failures/drawbacks (e.g., handshake failures) associated with the communication methods.

In one or more embodiments, when a SAS link is established between two end points, there may always be some data exchanged therebetween (e.g., at least to maintain the link "in sync"). In one or more embodiments, DWORDs, when exchanged as discussed above, may be preceded by a primitive. Here, a "primitive" may refer to a special DWORD that indicates the start of the DWORD exchange. In one or more embodiments, during communication between UUT 104 and protocol analyzer 106, trace data may be marked with a primitive, which enables protocol analyzer 106 to detect that the word following the primitive is the DWORD associated with the trace data. Thus, protocol analyzer 106 may be able to selectively buffer the trace data therein.

In one or more embodiments, protocol analyzer 106 may be configured to be trigged on by a primitive. In one or more embodiments, as discussed above, DWORDs following a primitive may be stored and buffered, following which protocol analyzer 106 is configured to be trigged on by the next primitive.

In one or more embodiments, in FIG. 1, protocol analyzer 106 may be configured to be coupled to host system 108 through a SAS link. In one or more embodiments, protocol analyzer 106 may also be configured to be coupled to host system 108 through a sideband communication channel such as Universal Serial Bus (USB) and Ethernet. In one or more embodiments, such a sideband communication channel may prove to be useful in scenarios where host system 108 may not have SAS capability provided therein. However, in one or more embodiments, in order for host system 108 to directly perform analysis/trace data capture as in FIG. 8, host system 108 may need to have SAS capability provided therein. When trace data capture/analysis is performed through protocol analyzer 106, it may not be mandatory for host system 108 to have SAS capability.

Although FIGS. 1-8 are discussed with regard to a SAS link/SAS topology/SAS environment 100, the exemplary embodiments are not restricted to the SAS domain. In one or more embodiments, any form of serial links (e.g., serial SCSI bus), parallel links (e.g., parallel SCSI bus), or other communication links is within the scope of the exemplary embodiments. At a basic level, as and when the trace data is generated, the trace data may be transmitted to the available link (e.g., serial link, parallel link) to an external means (e.g., protocol analyzer 106, host system 108) for buffering/analysis. In one or more embodiments, customer debugging may be eased through the lack of the need to open boxes of devices therefor. The exemplary embodiments discussed above provide a mechanism to non-intrusively buffer/capture trace data associated with components of SAS environment 100 (or, other environments based on different communication links).

In one or more embodiments, constituent nodes 102 may be networked (e.g., through Internet) to one another. In one or more embodiments, protocol analyzer 106/host system 108 may be networked to UUT 104. In one or more embodiments, protocol analyzer 106 and host system 108 may be networked to one another. In these scenarios, the appropriate network protocol may be utilized in conjunction with the communication link protocols (e.g., SAS). The exemplary embodiments find use in scenarios where there may be no debugging interfaces. However, it should be noted that in networks involving long distances, the time-stamping may be less accurate. In one or more embodiments, therefore, the choice of deployment may be dictated by expense and/or practicality.

Figure 9:
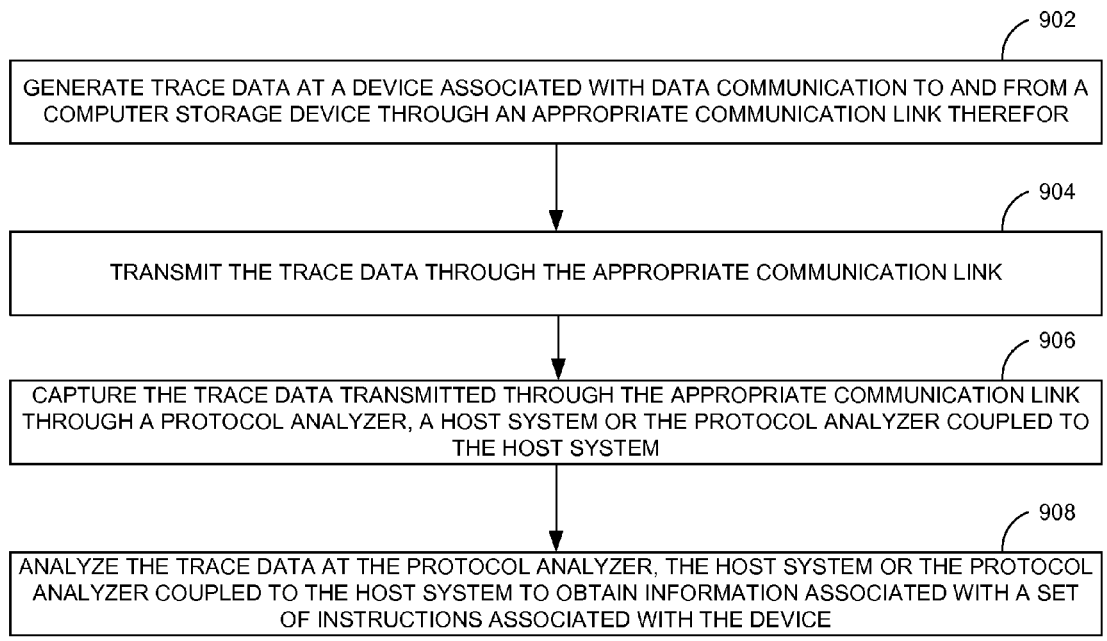
FIG. 9 is a process flow diagram detailing the operations involved in a method of tracing of a set of instructions (e.g., firmware) associated with a device in a storage data communication system, according to one or more embodiments.

FIG. 9 shows a process flow diagram detailing the operations involved in a method of tracing of a set of instructions (e.g., firmware) associated with a device (e.g., UUT 104) in a storage data communication system (e.g., SAS environment 100), according to one or more embodiments. In one or more embodiments, operation 902 may involve generating trace data at the device (e.g., UUT 104) associated with data communication to and from a computer storage device through an appropriate communication link therefor. In one or more embodiments, the trace data is configured to enable debugging of a set of instructions associated with the device (e.g., UUT 104). In one or more embodiments, operation 904 may involve transmitting the trace data through the appropriate communication link. In one or more embodiments, operation 906 may involve capturing the trace data transmitted through the appropriate communication link through a protocol analyzer 106, a host system 108 or protocol analyzer 106 coupled to host system 108.

In one or more embodiments, protocol analyzer 106, host system 108 or protocol analyzer 106 coupled to host system 108 may be configured to be external to the device (e.g., UUT 104) associated with the data communication to and from the computer storage device. In one or more embodiments, operation 908 may then involve analyzing the trace data at protocol analyzer 106, host system 108 or protocol analyzer 106 coupled to host system 108 to obtain information associated with the set of instructions associated with the device (e.g., UUT 104).

Figure 10:
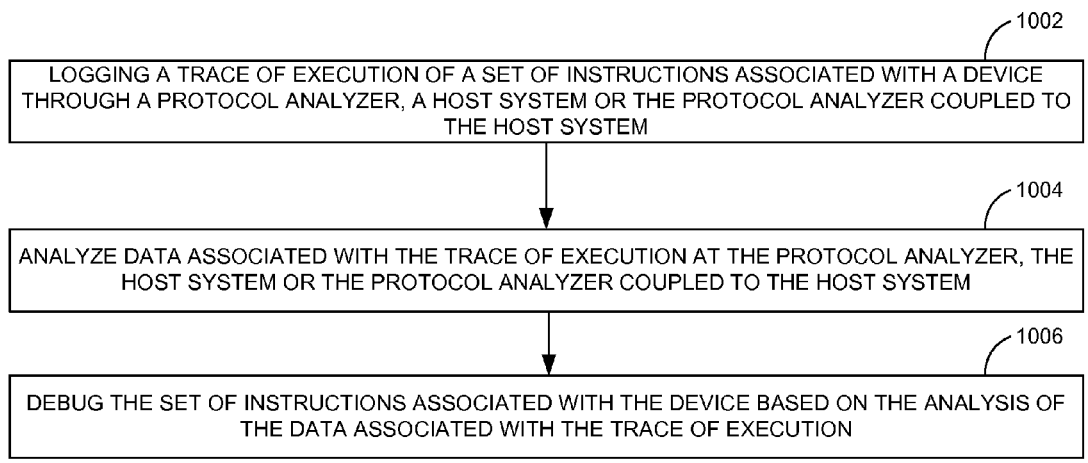
FIG. 10 is a process flow diagram detailing the operations involved in a method of enabling debugging of a set of instructions (e.g., firmware) associated with a device in a storage data communication system externally through a protocol analyzer, a host system or the protocol analyzer coupled to the host system, according to one or more embodiments.

FIG. 10 shows a process flow diagram detailing the operations involved in a method of enabling debugging of a set of instructions (e.g., firmware) associated with a device (e.g., UUT 104) in a storage data communication system (e.g., SAS environment 100) externally through a protocol analyzer 106, a host system 108 or protocol analyzer 106 coupled to host system 108, according to one or more embodiments. In one or more embodiments, operation 1002 may involve logging a trace of execution of a set of instructions associated with the device (e.g., UUT 104) through protocol analyzer 106, host system 108 or protocol analyzer 106 coupled to host system 108. In one or more embodiments, the device (e.g., UUT 104) is associated with data communication to and from a computer storage device through an appropriate communication link therefor.

In one or more embodiments, operation 1004 may involve analyzing data associated with the trace of execution at protocol analyzer 106, host system 108 or protocol analyzer 106 coupled to host system 108. In one or more embodiments, operation 1006 may then involve debugging the set of instructions associated with the device (e.g., UUT 104) based on the analysis of the data associated with the trace of execution. In one or more embodiments, protocol analyzer 106, host system 108 or protocol analyzer 106 coupled to host system 108 is configured to be external to the device (e.g., UUT 104) associated with the data communication to and from the computer storage device.

Although the present embodiments have been described with reference to specific example embodiments, it will be evident that various modifications and changes may be made to these embodiments without departing from the broader spirit and scope of the various embodiments. Also, for example, the various devices and modules described herein may be enabled and operated using hardware circuitry (e.g., CMOS based logic circuitry), firmware, software or any combination of hardware, firmware, and software (e.g., embodied in a machine readable medium).

In addition, it will be appreciated that the various operations, processes, and methods disclosed herein may be embodied in a machine-readable medium and/or a machine accessible medium compatible with a data processing system (e.g., a computer devices), and may be performed in any order (e.g., including using means for achieving the various operations). Accordingly, the specification and drawings are to be regarded in an illustrative rather than a restrictive sense.

What is claimed is:

1. A method comprising:
 generating trace data at a device associated with data communication to and from a computer storage device through an appropriate communication link therefor, the trace data being configured to enable debugging of a set of instructions associated with the device;

transmitting the trace data through the appropriate communication link;

capturing the trace data transmitted through the appropriate communication link through one of a protocol analyzer, a host system and the protocol analyzer coupled to the host system, the one of the protocol analyzer, the host system and the protocol analyzer coupled to the host system being configured to be external to the device associated with the data communication to and from the computer storage device, the capturing including logging trace points associated with the trace data in a trace buffer associated with the one of the protocol analyzer, the host system and the protocol analyzer coupled to the host system; and analyzing the trace data at the one of the protocol analyzer, the host system and the protocol analyzer coupled to the host system to obtain information associated with the set of instructions associated with the device, wherein when the trace data is captured through the host system and analyzed therein, the method further comprises:

storing the trace data in an intermediate trace buffer of the device prior to the transmission thereof;

issuing a command associated with reading the intermediate trace buffer of the device through the host system; and transmitting, as and when the trace data is available, the trace data from the intermediate trace buffer of the device to the host system upon the receipt of the command, the availability of the trace data being determined based on at least one of a threshold percentage of the intermediate trace buffer and a threshold period of inactivity therein, and the command being implemented as at least one of a vendor specific mode and multiple commands, each of which is limited in size, based on whether the device is corresponding one of capable and incapable of receiving concurrent commands associated with reading the intermediate trace buffer thereof.

2. The method of claim 1, further comprising time-stamping the trace data through a timer associated with the one of the protocol analyzer, the host system and the protocol analyzer coupled to the host system.

3. The method of claim 1, wherein transmitting the trace data through the appropriate communication link includes transmitting the trace data to the one of the protocol analyzer, the host system and the protocol analyzer coupled to the host system configured to be one of within the appropriate communication link and outside the appropriate communication link.

4. The method of claim 1, wherein the appropriate communication link is one of a serial Small Computer System Interface (SCSI) bus and a parallel SCSI bus.

5. The method of claim 1, wherein generating the trace data at the device includes:

encoding a DWORD with a unique identification data associated with the set of instructions at the device; and writing the unique identification data into a hardware register associated with the device.

6. The method of claim 5, further comprising:

logging a jammer in the appropriate communication link to be associated with the device; and triggering a tester action from the jammer through the unique identification data.

7. The method of claim 5, wherein when the trace data is captured through the protocol analyzer and analyzed therein, the method further comprises:

marking the DWORD at the device with a primitive; and triggering the protocol analyzer to receive the DWORD based on the primitive, wherein the primitive is a special DWORD configured to indicate a start of trace data exchange.

8. The method of claim 5, wherein the unique identification data is associated with at least one of:

an identifier of a file associated with the set of instructions and an identifier of a line number associated with the file, a variable associated with the set of instructions and a value associated with the variable, and an identifier of a function associated with the set of instructions and one of an entry marker and an exit marker associated with entry into the function and exit out of the function.

9. The method of claim 8, wherein analyzing the trace data at the one of the protocol analyzer, the host system and the protocol analyzer coupled to the host system includes:

regenerating at least one of a code execution and a history of the code execution associated with the set of instructions;

inferring a fault condition associated with the set of instructions;

detecting at least one of an addition and a removal of a storage device associated with the appropriate communication link; and measuring an execution time between points in the code execution based on a unique identification thereof.

10. A storage data communication system comprising:

a computer storage device;

a device configured to generate trace data associated with data communication to and from the computer storage device through an appropriate communication link therefor, the trace data being configured to enable debugging of a set of instructions associated with the device, wherein the device is configured to transmit the trace data through the appropriate communication link; and one of a protocol analyzer, a host system and the protocol analyzer coupled to the host system configured to capture the trace data transmitted through the appropriate communication link, the one of the protocol analyzer, the host system and the protocol analyzer coupled to the host system being configured to be external to the device associated with the data communication to and from the computer storage device, and the one of the protocol analyzer, the host system and the protocol analyzer coupled to the host system comprising a trace buffer configured to enable logging of trace points associated with the trace data therein, wherein the trace data is configured to be analyzed at the one of the protocol analyzer, the host system and the protocol analyzer coupled to the host system to obtain information associated with the set of instructions associated with the device, wherein when the trace data is captured through the host system and analyzed therein, the device comprises an intermediate trace buffer therein configured to enable storage of the trace data generated therein prior to the transmission thereof, wherein the host system is further configured to issue a command associated with reading the intermediate trace buffer of the device, and wherein the device is further configured to transmit, as and when the trace data is available, the trace data from the intermediate trace buffer to the host system upon the receipt of the command, the availability of the trace data being determined based on at least one of a threshold percentage of the intermediate trace buffer and a threshold period of inactivity therein, and the command being implemented as at least one of a vendor specific mode and multiple commands, each of which is limited in size, based on whether the device is corresponding one of capable and incapable of receiving concurrent commands associated with reading the intermediate trace buffer thereof.

11. The storage data communication system of claim 10, wherein the one of the protocol analyzer, the host system and the protocol analyzer coupled to the host system further comprises a timer configured to time-stamp the trace data.

12. The storage data communication system of claim 10, wherein the appropriate communication link is one of a serial SCSI bus and a parallel SCSI bus.

13. A method comprising:
logging a trace of execution of a set of instructions associated with a device through one of a protocol analyzer, a host system and the protocol analyzer coupled to the host system, the device being associated with data communication to and from a computer storage device through an appropriate communication link therefor;
analyzing data associated with the trace of execution at the one of the protocol analyzer, the host system and the protocol analyzer coupled to the host system; and
debugging the set of instructions associated with the device based on the analysis of the data associated with the trace of execution,
wherein the one of the protocol analyzer, the host system and the protocol analyzer coupled to the host system is configured to be external to the device associated with the data communication to and from the computer storage device, and
wherein when the data associated with the trace of execution is logged through the host system and analyzed therein, the method further comprises:
storing the data associated with the trace of execution in an intermediate trace buffer of the device prior to the transmission thereof;
issuing a command associated with reading the intermediate trace buffer of the device through the host system; and
transmitting, as and when the data associated with the trace of execution is available, the data associated with the trace of execution from the intermediate trace buffer of the device to the host system upon the receipt of the command, the availability of the data associated with the trace of execution being determined based on at least one of a threshold percentage of the intermediate trace buffer and a threshold period of inactivity therein, and the command being implemented as at least one of a vendor specific mode and multiple commands, each of which is limited in size, based on whether the device is corresponding one of capable and incapable of receiving concurrent commands associated with reading the intermediate trace buffer thereof.

14. The method of claim 13, further comprising:
generating the trace of execution at the device; and
transmitting the trace of execution through the appropriate communication link to the one of the protocol analyzer, the host system and the protocol analyzer coupled to the host system.

15. The method of claim 14, wherein generating the trace of execution at the device comprises:
encoding a DWORD with a unique identification data associated with the set of instructions at the device; and
writing the unique identification data into a hardware register associated with the device.

16. The method of claim 15, wherein the unique identification data is associated with at least one of:
an identifier of a file associated with the set of instructions and an identifier of a line number associated with the file,
a variable associated with the set of instructions and a value associated with the variable, and
an identifier of a function associated with the set of instructions and one of an entry marker and an exit marker associated with entry into the function and exit out of the function.

17. The method of claim 16, wherein analyzing the data associated with the trace of execution at the one of the protocol analyzer, the host system and the protocol analyzer coupled to the host system includes:
regenerating at least one of a code execution and a history of the code execution associated with the set of instructions;
inferring a fault condition associated with the set of instructions;
detecting at least one of an addition and a removal of a storage device associated with the appropriate communication link; and
measuring an execution time between points in the code execution based on a unique identification thereof.

* * * * *